Jan. 1, 1974  E. H. LAND  3,783,075
METHOD OF MANUFACTURING PHOTOGRAPHIC FILM UNIT
Original Filed March 6, 1969  2 Sheets-Sheet 1
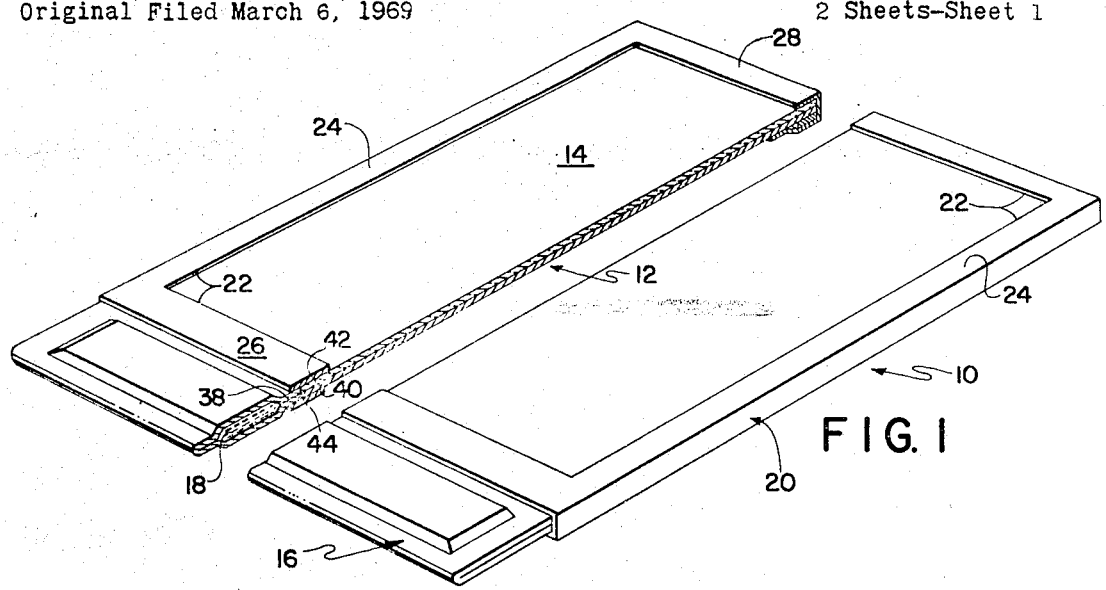
FIG. I
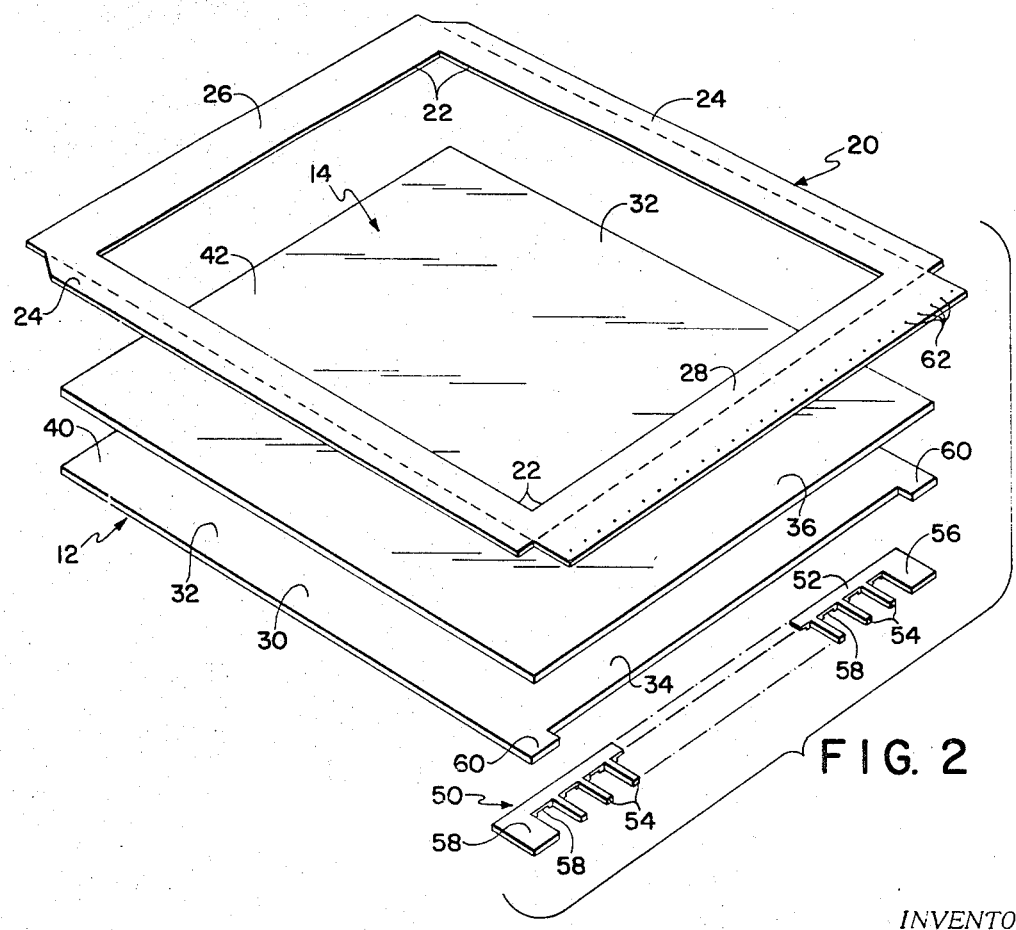
FIG. 2
INVENTOR.
EDWIN H. LAND
BY Brown and Mikulka
and
Robert E. Corb
ATTORNEYS 3,783,075
**METHOD OF MANUFACTURING PHOTO-
GRAPHIC FILM UNIT**
Edwin H. Land, Cambridge, Mass., assignor to Polaroid
  Corporation, Cambridge, Mass.
Application Mar. 6, 1969, Ser. No. 804,942, now Patent
  No. 3,652,282, which is a continuation-in-part of appli-
  cation Ser. No. 782,056, Dec. 9, 1968, now Patent No.
  3,573,043, dated Mar. 30, 1971, which in turn is a
  continuation-in-part of application Ser. No. 622,283,
  Mar. 10, 1967, now Patent No. 3,415,644, dated Dec.
  10, 1968. Divided and this application Dec. 23, 1971,
  Ser. No. 211,176
    Int. Cl. B32b 7/00; C09j 5/00; G03c 1/48
U.S. Cl. 156—309                              8 Claims

ABSTRACT OF THE DISCLOSURE

Method of producing a photographic film unit adapted to be exposed and processed to produce a color image, comprising laminating first and second sheets in face-to-face relation and attaching a rupturable container of a processing liquid to the exterior of the sheets for dispensing its liquid contents between the sheets. The film unit is adapted to be processed by progressively applying compressive pressure to the container and sheets to spread the processing liquid between the sheets with delamination and lamination occurring during and by virtue of spreading of the processing liquid. The sheets are formed by coating at least one of a pair of layers with at least a plurality of layers including a water-soluble, polymeric layer containing a plurality of photosensitive, image-recording strata, e.g., differently sensitized gelatino silver halide emulsions. The other sheet includes a dimensionally stable layer which may be coated with one or more processing solution soluble or permeable, polymeric layers such as a dyeable polymer. Each of the layers of the film unit is preferably coated on its respective dimensionally stable layer or support as an aqueous system and dried prior to lamination of the two sheets with the polymeric layers sandwiched therebetween. The two sheets are laminated to one another by progressively pressing the sheets into superposition while distributing an aqueous solution of a water-soluble polymeric material between the sheets to form a bond that is adapted to rupture readily and cleanly by and in response to spreading of the processing liquid and is weaker than the bond between any other layers or strata of the film unit.

---

This application is a division of application Ser. No. 804,942, filed Mar. 6, 1969, now Pat. No. 3,652,282, as a continuation-in-part of application Ser. No. 782,056, filed Dec. 9, 1968, now Pat. No. 3,573,043, issued Mar. 30, 1971, which is in turn a continuation-in-part of application Ser. No. 622,283, filed Mar. 10, 1967, now Pat. No. 3,415,644, issued Dec. 10, 1968. Self-developing film units formed according to the method of the invention generally include a photosensitive sheet, a transparent, image-receiving sheet, a rupturable pod or container of processing liquid adapted, when distributed between the sheets following exposure of the photosensitive sheet, to produce a transfer image visible through the image-receiving sheet, and a combination mask and binding element for retaining the sheets in face-to-face relation, coupling the container to the sheets and assisting in the distribution of the processing liquid between the sheets. The container of processing liquid is of the type which, when subjected to compressive pressure, discharges its liquid contents unidirectionally, and the film unit comprises means including the binding element for conducting the liquid between the sheets where it is distributed in a thin layer by advancing the sheets between the pair of pressure-applying members employed to compress and rupture the container. The combination mask and binding element aids in the proper spread and distribution of the processing liquid within the film unit by securing the sheets to one another at their lateral edges so as to confine the processing liquid to the region between the sheets while permitting the sheets to separate to their edges and by spacing apart medial portions of the pressure-applying members. The film unit is designed to remain intact following processing, with the liquid spread between the sheets functioning to laminate the sheets to one another.

Film units of the type formed by the method of the present invention basically comprise two separate sheet-like elements. A number of advantages can be realized by laminating the two elements during the manufacture and assembly process and delaminating the elements following exposure during spreading of the processing liquid. For example, a prelaminated integral film unit is easier to handle and manipulate during assembly and during exposure and processing within the camera; it is more compact and hence, permits smaller and less bulky film packs and cameras; it is less subject to buckling and distortion due to temperature and humidity changes and more likely to lie flat and remain planar during exposure; since the elements are in contact throughout the entire extent of their facing surface, every portion of each element is exposed to substantially the same ambient conditions so that each portion has the same physical and chemical properties as every other portion and the elements produce uniform results; the photographically active layers of the film unit are additionally protected against changes in ambient conditions which may also effect their function; and processing, specifically, spreading of the processing liquid within the film unit, is facilitated since there is little or substantially no air between the sheets to interfere with liquid distribution.

A prelaminated film unit, similar in some respects to the film unit of the invention and disclosed in my U.S. Pat. No. 3,053,659, issued Sept. 11, 1962, provided the aforementioned advantages and the solution to a number of problems, particularly those relating to distribution of the processing liquid in a layer of the required uniform thickness over the entire image area and providing sufficient processing liquid in the regions immediately adjacent the edges of the image area. These same problems are further complicated by the fact that a film unit of the type embodying the present invention adapted to produce a diffusion transfer image in full color incorporates a photosensitive element having a photosensitive layer comprising a number of strata including differently sensitized photosensitive emulsions and additional strata such as barrier and insulating strata, filters and strata containing other materials and reagents such as developing agents and the like, and an image-receiving element including an image-receiving layer adapted to provide a support for a transfer image as well as including other strata containing reagents active in the image-forming process. Many considerations such as manufacture and assembly of the various strata comprising the elements, lamination of the elements during manufacture and assembly, and, particularly, delamination of the elements at the proper strata during processing will become more involved as a result of the increased complexity of the film unit structure and the image-forming process being performed, and the fact that the elements are designed to remain laminated following processing.

An object of the invention is to provide a novel and improved method of laminating multilayer photosensitive and image-receiving elements to one another in a way that does not interfere with exposure of the photosensitive element, enables the two elements to be delaminated rapidly and easily in response to mechanical forces exerted during spreading of a processing liquid between the two elements, does not interfere with spreading of the processing liquid, insures that delamination will occur cleanly between particular layers without damage to the latter, and does not interfere with subsequent processing and lamination of the elements.

These and other objects of the invention are achieved by providing a novel aqueous system for laminating the two water-soluble polymer-containing photosensitive and image-receiving layers to one another by a water-soluble polymer which forms an adhesive bond between the photosensitive and image-receiving layers, or facing strata thereof, which is weaker than the bond formed between any other pair of adjacent layers or strata.

Other objects of the invention will in part be obvious and will in part appear hereinafter.

The invention accordingly comprises the method involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a perspective view, partially in section, of a film unit produced by the method of the invention;

FIG. 2 is an exploded perspective view of the film unit of FIG. 1;

Although a film unit produced by the method of the invention may be adapted to the performance of a number of different image-forming processes, the preferred form of film unit is especially designed for the production of a positive photographic print in full color formed by a diffusion transfer process in which a photographic image-recording medium including a photosensitive material such as silver halide emulsion is exposed to form an image (latent) therein and is treated by wetting with a liquid processing agent to develop the image in the image-recording medium, form an imagewise distribution of transferable image providing substances and transfer the image-providing substances by diffusion to an image-receptive stratum in which they are immobilized to form a visible positive image.

Figure 3:
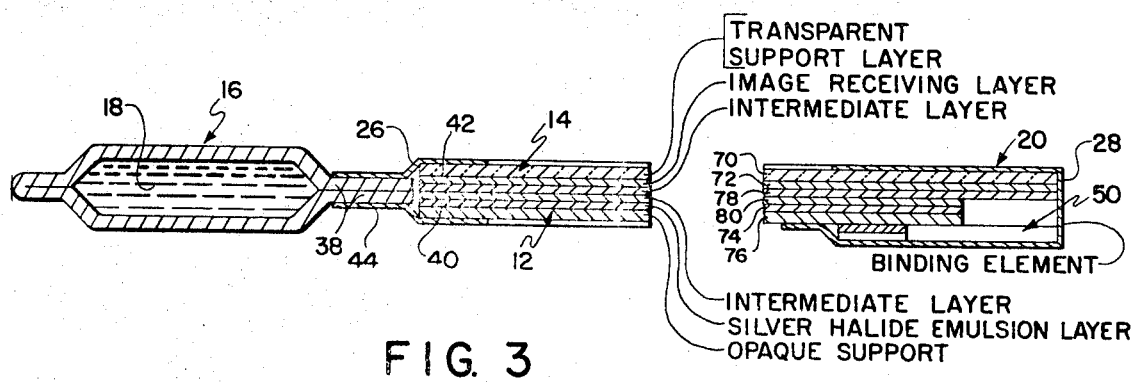
FIG. 3 is a somewhat schematic, longitudinal sectional view of the film unit of FIG. 1, the thickness of the materials being exaggerated for purposes of clarity of illustration.

A preferred embodiment of film unit of this type is disclosed in the aforementioned Land Pat. No. 3,415,644, and includes all of the materials and reagents required to produce a full color photographic print by a process such as disclosed in U.S. Pat. No. 2,983,606, issued May 9, 1961, in the name of Howard G. Rogers. These patents disclose a photosensitive element including a plurality of silver halide emulsion and dye developer layers, the dye developer being a dye which is a silver halide developing agent; a second or image-receiving element including an image-receiving layer of a water-soluble, dyeable polymeric material; and an aqueous alkaline processing liquid in which the dye developer is soluble. The photosensitive and image-receiving elements are superposed with the emulsion and image-receiving layers in face-to-face relation and the processing liquid is distributed in a uniform layer between layers of the film unit for permeation into the photosensitive layer where it initiates development of exposed silver halide. The dye developer is immobilized or precipitated in exposed areas as a consequence of development while in unexposed areas and partially exposed areas of the emulsion, the dye developer remains unreacted and diffusible, thereby providing an imagewise distribution of unoxidized dye developer which is transferred, at least in part, by diffusion to the image-receiving layer without altering the imagewise distribution of the dye developer, to form a reversed or positive color image of the developed latent image in the emulsion. Multicolor transfer images are obtained utilizing dye developers, for example, by employing an integral multilayer photosensitive element such as illustrated in FIG. 3 of the 3,415,644 patent or in FIG. 9 of the 2,983,606 patent, including at least two selectively sensitized overlying photosensitive strata on a single support. A typical photosentive element of this type comprises a support carrying a red sensitive silver halide emulsion stratum, a green sensitive silver halide emulsion stratum, and a blue sensitive silver halide emulsion stratum, the emulsions having associated therewith, respectively, for example, a cyan dye developer, a magenta dye developer and a yellow dye developer. Each set of silver halide emulsion and associated dye developer strata may be separated from other sets by suitable interlayers formed, for example, of gelatin or polyvinyl alcohol and the multiple strata constituting the photosensitive layer may be coated with one or more additional strata for performing other functions not related to lamination or delamination of the photosensitive layer to or from another layer. In the example given, the dye developers are preferably selected for their ability to provide colors useful in producing a full color image by a subtractive process and may be incorporated in the respective silver halide emulsion with which they are associated or in a separate layer behind their respective silver halide emulsion. In certain instances, a yellow filter is incorporated in the laminate located in front of the green sensitive emulsion and comprising a yellow dye developer or a separate layer of a yellow filter material.

Reference is now made to FIGS. 1 through 3 of the drawings wherein there is illustrated a pohtographic film unit 10 produced by the method of the invention, the thickness of the materials being exaggerated to faciliate understanding. Film unit 10 comprises a photosensitive or image-recording sheet or element 12, a second or image-receiving sheet or element 14 and a rupturable container 16 holding a quantity of processing liquid 18. Sheetlike elements 12 and 14 are preferably rectangular and coextensive with one another and are arranged in superposed face-to-face contact with at least the lateral edges of each element aligned with the lateral edges of the other. A binding element 20, in the form of a rectangular sheet larger than either of the photosensitive or image-receiving sheets, is secured to the two sheets at the margins thereof for retaining the sheets in superposed relation. Binding element 20 is in the general form of a frame having a large rectangular opening 22 defining the extent of the image produced in the film unit, surrounded by lateral edge portions 24 and end portions 26 and 28. Sheet 12 includes lateral marginal portions 30 and an end marginal portion 34 and sheet 14 includes lateral marginal portions 32 and an end marginal portion 36 with the lateral and end marginal portions of the two sheets being located in face-to-face contact, preferably with the edges of the lateral marginal portions in alignment. The lateral edge portions 24 and end portion 26 of binding element 20 are secured around and to, respectively, lateral marginal portions 30 and 32 of elements 12 and 14 and end marginal portions 34 and 36 of the elements effectively binding the two elements to one another along three sides thereof. In a preferred form of film unit adapted to produce a reflection print surrounded by a white border and viewed against a white background, at least binding element 20 is formed of an opaque, white material and container 16 may also include a suitable outer coating (e.g. white) to provide a more aesthetically pleasing product.

Container 16 is of the type shown in U.S. Pat. No. 2,543,181, formed by folding a rectangular blank of a fluid-impervious sheet material medially and sealing the marginal sections of the blank to one another to form a cavity for containing a viscous processing liquid 18. The seal between longitudinal marginal sections 38 of the container is adapted to rupture and form a discharge mouth at least equal in length to the length of the cavity and the width of opening 22 through which processing liquid 18 is discharged. Container 16 is attached to the photosensitive and image-receiving elements at the edges thereof opposite end portions 34 and 36, preferably with the longitudinal edge of the container located closely adjacent the edges of the elements between which the liquid is to be distributed. Sheets 12 and 14 include, respectively, end marginal portions 40 and 42 and the means for coupling the container to the sheets include end portion 28 of binding element 20 secured to end marginal portion 42 of sheet 14 and longitudinal marginal sections 38 of the container so as to bridge the container and sheet 14; and a strip 44 secured to end marginal portion 40 of sheet 12 and the other longitudinal marginal section 38 of the container to bridge the gap between the container and sheet 12. The binding element and strip 44 cooperate to provide a liquid-tight seal between the marginal sections of the container defining the discharge mouth thereof and sheets 12 and 14; and form a conduit for conducting the liquid from the container between the sheets at end marginal portions 40 and 42 thereof.

The most useful and advantageous film unit insofar as packaging, storing, handling, exposure, and processing are concerned, is one characterized by an integral, unitary, laminate form of structure designed so that its integrity may be maintained during and after exposure and processing; and a structure that is sturdy, has some flexibility, resists buckling and warping, remains flat particularly during exposure, and can be handled and manipulated by mechanical means without damage to produce a useful and attractive photographic print. A useful and attractive photographic print can be described as being substantially flat or planar and without a tendency to curl as the result of temperature and humidity changes; as being relatively rigid and inflexible as opposed to being limp or easily bent; as having a uniform white border surrounding a well-defined rectangular image that extends to the border; and a protective coating or covering for the image permitting the print to be handled and stored without the necessity for taking special precautions to avoid damage and deterioration. The structure and composition of components of the film unit of the invention combine to provide a film unit meeting these criteria and specially adapted, when processed, to provide a useful and attractive photographic print, preferably in full color, having the foregoing characteristics.

In order to provide a rigid durable structure having an integrity which is maintained from the time of assembly (during manufacture) to the finished print and providing a protective environment for the photosensitive medium as well as the final image, while permitting exposure of the photosensitive medium and viewing of the final image, at least one of the sheets of the film unit is formed of a transparent material. In the embodiment shown, the second or image-receiving sheet is transparent and the photosensitive medium is exposed and the final image is viewed through the image-receiving sheet which functions to protect the image-recording medium prior to and during exposure and to protect the final image during and following formation thereof. In other embodiments of the film unit, the photosensitive sheet may be transparent depending upon the manner in which the image-recording medium is exposed and the final image is formed and viewed. The transparent image-receiving sheet may be formed of a conventional film base material such as cellulose triacetate coated on its inner surface with one or more layers providing an appropriate environment for the formation of a diffusion transfer image. In a film unit designed to produce a color image in terms of a dye developer, the image-receiving sheet may be prepared as disclosed in the following example, by coating a transparent cellulose triacetate film base in succession with the following layers or strata to form an image-receiving layer:

(1) The partial butyl ester of polyethylene/maleic anhydride copolymer prepared by refluxing, for 14 hours, 300 grams of high viscosity poly-(ethylene/maleic anhydride), 140 grams of n-butyl alcohol and 1 cc. of 85% phosphoric acid to provide a polymeric acid layer approximately 0.75 mil thick;

(2) A solution of hydroxypropyl cellulose in water to provide a polymeric spacer layer approximately 0.075 mil thick; and (3) a 2:1 mixture, by weight, of polyvinyl alcohol and poly-4-vinylpyridine, at a coverage of aproximately 600 mgs./ft.$^2$, to provide a polymeric image-receiving layer approximately 0.40 ml. thick.

In a preferred embodiment of the film unit useful in color photography and incorporating an image-receiving sheet prepared as described above, the image-recording sheet is preferably opaque to actinic light and is prepared, for example, by coating in succession on a gelatin subbed opaque cellulose triacetate film base, the following layers or strata to form an image-receiving layer:

(1) A layer of cyan dye developer 1,4-bis-($\beta$-[hydroquinonyl-$\alpha$-methyl]-ethylamino) - 5,8 - dihydroxy-anthraquinone dispersed in gelatin and coated at a coverage of about 150 mgs./ft.$^2$ of dye and about 200 mgs./ft.$^2$ of gelatin;

(2) A red-sensitive gelatino-silver iodobromide emulsion coated at a coverage of about 200 mgs./ft.$^2$ of silver and about 100 mgs./ft.$^2$ of gelatin;

(3) A layer of gelatin coated at a coverage of about 200 mgs./ft.$^2$;

(4) a layer of magenta dye developer 2-(p-[$\beta$-hydroquinonylethyl]-phenylazo)-4-isopropoxy-1 - naphthol dispersed in gelatin and coated at a coverage of 70 mgs./ft.$^2$ of dye and about 100 mgs./ft.$^2$ of gelatin;

(5) a green-sensitive gelatino-silver iodobromide emulsion coated at a coverage of about 100 mgs./ft.$^2$ of silver and 60 mgs./ft.$^2$ of gelatin;

(6) A layer of gelatin coated at a coverage of about 150 mgs./ft.$^2$;

(7) A layer of the yellow dye developer 4-(p-[$\beta$-hydroquinonylethyl]-phenylazo) - 3 - (N-n - hexylcarboxamido) - 1 - phenyl-5-pyrazolone dispersed in gelatin and coated at a coverage of about 40 mgs./ft.$^2$ of dye and 50 mgs./ft.$^2$ of gelain;

(8) A blue-sensitive gelatino-silver iodobromide emulsion coated at a coverage of about 60 mgs./ft.$^2$ of silver and about 50 mgs./ft.$^2$ of gelain; and (9) A layer containing 4'-methylphenylhydroquinone dispersed in gelatin and coated at a coverage of about 10 mgs./ft.$^2$ of 4'-methylphenyl hydroquinone and about 30 mgs./ft.$^2$ of gelatin. The image-recording and image-receiving elements may incorporate other strata and coatings commonly employed in photographic products of this type such as optical coatings for preventing halation and reflection and otherwise improve the optical properties of the sheet material and to facilitate and improve exposure and viewing of the final image. Such layers are known to be provide for protecting underlying layers during manufacture and assembly of the film unit and/or to inhibit or prevent the transfer of reagents between the photosensitive and image-receiving layers. For further details and examples of the composition and structure of image-recording and image-receiving sheets suitable for incorporation in the film unit of the invention, reference may be had to U.S. Pat. No. 3,415,644.

The embodiment of the film unit illustrated and described herein is adapted to be exposed and processed to produce a multicolor dye transfer image in a dyeable polymeric layer located between a transparent film on which the dyeable polymeric layer is supported and an opaque layer located between the image and the photosensitive medium. This opaque layer comprises the liquid contents 18 of container 16 provided in sufficient quantity to form a layer of predetermined thickness, e.g., of the order of .004 inch, when distributed uniformly between the sheets over an area at least coextensive wth opening 22 in binding element 20. In order to insure that the quantity of liquid 18 supplied in the container is at least sufficient to form a layer of the desired minimum thickness and extent, the processing liquid is provided in a quantity in excess of the minimum amount required. The processing liquid contained in container 16 comprises an aqueous alkaline solution htaving a pH at which the dye developers are soluble and diffusible and contains an opacifying agent in a quantity sufficient to mask the dye developers retained in the image-recording layer (laminate) subsequent to processing; and a film-forming viscosity-increasing agent or agents to facilitate rupture of the container and distribution of the liquid processing composition and help in maintaining the layer of processig composition as a structurally stable layer tending to bind the sheets to one another.

As a general rule, the opacifying agent will be present in the layer of liquid spread between the transparent image-receiving element and the opaque image-recording element in a concentration sufficient to prevent further exposure of the image-recording medium by actinic radiation transmitted by the transparent image-receiving element. Because the silver halide emulsion or emulsions comprising the image-recording strata are thus protected against exposure by incident actinic radiation at one major surface by the opaque processing composition and at the remaining major surface by the opaque support sheet or layer of the photosensitive element, it is possible to process the film unit subsequent to distribution of the liquid processing composition in the presence of actinic radiation and thereby eliminate the need to provide a processing chamber within the camera and/or make it possible to withdraw the film unit from the camera almost immediately following distribution of the processing liquid. Binding element 20, strip 44 and the material comprising container 16 are also formed of a material opaque to actinic radiation to prevent exposure of the image-recording medium by light entering the laminated assembly at the edges thereof. The opacifying agent is selected for its suitability as a background for viewing the dye-transfer image formed in the dyeable polymeric layer as well as for its opaque property. Another factor considered in the selection of the opacifying agent is the requirement that it does not interfere with the formation and color integrity of the dye-transfer image in the image-receiving sheet and that the agent be aesthetically pleasing and does not provide a "noisy" background that may degrade the image or detract from the information content thereof. Opacifying agents particularly desirable for incorporation in the liquid processing composition are those providing a white background for viewing the transfer image and particularly those compositions conventionally employed to provide a background for photographic reflection prints and having optical properties particularly suited for the reflection of incident radiation.

As examples of suitable opacifying agents, mention may be made of barium sulfate, zinc oxide, titanium dioxide, barium stearate, silver flake, silicates, alumina, zirconium oxide, zirconium acetyl acetate, sodium zirconium sulfate, kaolin, mica, and the like. A liquid processing composition suitable for incorporation in container 16 for use in combination with sheet materials of the type disclosed in the foregoing example is as follows:

| Component | Amount |
|---|---|
| Water _____cc__ | 100 |
| Potassium hydroxide _____grams__ | 11.2 |
| Hydroxyethyl cellulose (high viscosity) [commercially available from Hercules Powder Co., Wilmington, Del., under the trade name Natrasol 250] _____do____ | 3.4 |
| N-benzyl-$\alpha$-picolinium _____do____ | 1.5 |
| Benzotriazole _____do__ | 1.0 |
| Titanium dioxide _____do____ | 40.0 |

Reference may be had to the aforementioned patent for additional details and examples of liquid processing compositions adapted for incorporation of the invention to effect the process thereof.

Subsequent to exposure, film unit 10 is processed by moving the film unit with container 16 foremost relative to and between a pair of juxtaposed rollers, for applying compressive pressure first to the container to eject the fluid contents of the container between the photosensitive and image-recording sheets 12 and 14 and then spread processing liquid 18 in a uniform, thin layer between sheets over an area at least coextensive with opening 22 in binding element 20. As previously noted, the processing liquid includes an agent for increasing the viscosity of the liquid so as to promote opening of the discharge passage of the container throughout substantially its entire length and facilitate the discharge of the liquid from the container and spreading of the liquid between the sheets. For this purpose, the liquid should be quite viscous and contain the film-forming material in quantities sufficient to impart a viscosity in excess of 1000 centipoises at a temperature of 20° C., and preferably of the order of 1000 to 200,000 centipoises at said temperature.

During processing, as the film unit is moved between a pair of pressure-applying members, compressive pressure is initially applied to container 16 generating hydraulic pressure in liquid 18 effecting the rupture of the bond between longitudinal marginal sections 38 of the container and the discharge of liquid 18 in the form of an elongated mass between sheets 12 and 14 at end marginal portions 40 and 42 thereof. Continued movement of the film unit relative to and between the pressure-applying members causes advancement of the mass of liquid between the sheets toward the opposite end thereof and spreading of the liquid as a thin layer of predetermined thickness between and in contact with the facing surfaces of the sheets.

An important factor contributing to the assurance of a complete spread is the presence of an excess quantity of the processing liquid. The processing liquid is initially spread in a layer having a depth approximately twice the thickness of the binding element and calculated to provide aqueous liquid sufficient to permeate the layer containing the photosensitive medium and effect formation of a diffusion transfer image. As the liquid permeates the photosensitive layer and is absorbed and/or dissipated by sheets 12 and 14, the thickness of the liquid layer is reduced and the film-forming agent solidifies to provide a dimensionally stable opaque layer providing a background for the transfer image and tending to adhere the sheets to one another to form a laminate in which the integrity of the film unit structure is preserved.

As previously noted, the film unit described is designed to be processed by movement between a pair of pressure-applying members such as rolls to distribute the processing liquid in a layer that is continuous and extends throughout the entire area within opening 22 of binding element 20. During spreading, liquid 18 is advanced between the sheets as a mass located immediately ahead of the pressure-applying rolls and extending from side to side of the region defined by opening 22. The binding elements at the lateral margins of the sheets function to prevent escape of the processing liquid while permitting the sheets to separate to their margins during spreading of the processing liquid.

As previously noted, in order to insure distribution of the liquid in a layer of uniform, minimum, predetermined depth over the entire exposed region to the trailing end thereof and allow some tolerance in the manufacture and filling of the container as well as the depth of the layer of liquid, it is considered necessary to provide excess processing liquid. This makes it necessary to provide for collecting and retaining the excess processing liquid within the film unit at the trailing end thereof and prevent the caustic liquid from escaping and contaminating the apparatus, e.g. camera, in which the film unit is processed or coming into contact with the operator. Collection and retention of the processing liquid is accomplished by providing a space or spaces within the film unit in which the processing liquid is trapped or collected and from which the processing liquid cannot be squeezed by the pressure-applying members employed to spread the liquid.

In the form of the film unit shown in the drawings, excess processing liquid is collected and retained within trapping spaces provided within the bounds of the trailing end region of the film unit, that is, between the edge of the image area and the trailing edge of the film unit. Excess processing liquid is collected and retained externally of the sheets between which the image is formed within the film unit between one of the sheets and a trailing end portion of binding element 20. The trapping means includes an elongated, generally comb-shaped spacing element 50 adapted to be secured between the trailing end portion of one of the sheets, preferably photosensitive sheet 12, and trailing end section 28 of binding element 20 to provide trapping spaces therebetween in which excess processing liquid is collected and retained. Spacing element 50 includes a longitudinal section 52, uniformly spaced teeth 54 extending from the longitudinal section, and end sections 56 in the form of widened teeth extending from the ends of longitudinal section 52. Longitudinal section 52 is formed with recess 58 located intermediate teeth 54. Spacing element 50 is formed of a relatively incompressible material and has a thickness dependent upon the quantity of excess processing liquid to be collected and retained.

Spacing element 50 is secured between trailing end portion 28 of binding element 20 and end marginal portion 34 of photosensitive sheet 12 with teeth 54 extending toward the trailing end of the film unit to at least the trailing edge of the photosensitive sheet to provide between the teeth, photosensitive sheets and binding element, spaces or reservoirs opening toward the trailing end of the film unit. End marginal section 28 of binding element 20 is adhered along its edge (trailing) to photosensitive sheet 12 adjacent longitudinal section 52 of the spacing element and may also be adhered to the outer surface of the spacing element with the inner surface thereof being adhered to the photosensitive sheet, thereby further insuring integrity of the structure. At least the medial portion of the photosensitive sheet, i.e. the portion located intermediate end sections 56 of the spacing element, may be shorter than the second sheet 14 so that the trailing edge of the first sheet is spaced inwardly from the trailing edge of the second sheet. In the form shown in FIG. 2, the photosensitive sheet includes extended sections 60 at its lateral edges corresponding to end sections 56 and extending beyond the trailing edge of the medial portion of the photosensitive sheet to substantially the trailing edge of the second sheet.

During processing of the film unit, the processing liquid is advanced as a mass between sheets 12 and 14 by and ahead of the pressure-applying members toward the trailing end of the film unit and any excess processing liquid is spread beyond the trailing edge of the image area between the trailing end marginal portions 34 and 36 of sheets 12 and 14 and thence beyond the trailing edge of photosensitive sheet 12. The teeth 54 of spacing element 50, being incompressible, function to hold apart the facing surfaces of sheet 12 and trailing end portion 28 of binding element 20 in the same region, thereby providing a space exterior of the two sheets into which the excess processing liquid is free to flow. End section 56 of spacing element 50 and extended section 60 of sheet 12 extend to the trailing edge of sheet 14 and cooperate to maintain the space within the binding element between the trailing edge of sheet 12 and the trailing edge of sheet 14 required to enable the excess processing liquid to flow from between the sheets into the trapping spaces between the teeth of the spacing element.

As previously noted, there are a number of advantages to be realized from laminating elements 12 and 14 to one another during manufacture and assembly. For example, it should be apparent from the foregoing discussion that air between the elements may interfere with spreading of the processing liquid and that there will be little or no air between elements which are laminated in face-to-face relation and sealed at their edges to one another and to a container of processing liquid. It has been found that prelaminating the elements may further facilitate spreading of the processing liquid which, as it is being advanced as a mass between the elements, causes the elements to be forced apart from one another ahead of the mass of liquid due to the structural strength of the elements, thereby causing rupture of the bond between the elements immediately ahead of the mass of advancing processing liquid. The separation of the elements as the bond is ruptured provides a region of reduced pressure, into which the processing liquid is drawn in the direction in which it is being spread. Moreover, by adhering the sheets in face-to-face relation, a thinner, more compact structure is obtained in which there can be no motion of the sheets relative to one another, and distortion or buckling of the sheet is prevented. These latter two factors are especially important during exposure when the photosensitive sheet is required to be located with a substantial degree of preciseness in the image plane of the camera lens and particularly when a number of stacked film units are involved with the foremost film unit being urged by means at the opposite side of a stack into position for exposure with the second sheet of the film unit located against the positioning means. Another significant result of prelamination is that all areas of facing (laminated) surfaces of the two elements are subjected to essentially the same ambient conditions. Thus, every part of the photosensitive layer or image-receiving layer is contacted by the same substance in the same manner as every other part, and image-formation will not be effected by differences in ambient conditions within different regions of the film unit.

My aforementioned 3,053,659 patent suggests utilizing the inherent adhesive properties of the photosensitive layer, i.e. gelatin, to laminate the sheets of the film unit to one another, thereby establishing and maintaining an aqueous system free of organic solvents. However, this may be impractical when the photosensitive layer comprises a number of selectively sensitized photosensitive strata as well as other strata and an image-receiving layer, which may also include a plurality of strata, each also including a water-soluble polymer. A major problem to be solved is separation of the sheets at the proper strata or layers during and in response to spreading of the processing liquid. Obviously, separation of photosensitive strata from another stratum (e.g. photosensitive) of the same photosensitive layer cannot be tolerated, and it is difficult to vary the adherent properties of strata to insure proper separation when the strata, although differently sensitized, are essentially the same physically. The answer to this problem has been found to lie in distributing another material, specifically, a polymeric, water-soluble, film-forming material, that is, a material capable of forming a thin layer having adhesive properties, between the layers at which delamination is to occur. Such a film forming material is selected to function both as an adhesive and to modify the adhesive properties of the layers of the two photographic elements, in the preferred embodiment, actually producing a bond between the adjacent layers of the two elements that is weaker than the bond which would otherwise be formed if the layers (photosensitive and image-receiving) were laminated by a solvent, such as water, activating the inherent adhesive properties thereof. A polymeric film-forming system suitable for use with photosensitive and image-receiving elements of the type represented by the example given should posses certain desirable physical characteristics including resistance to blocking at high humidities, resistance to bushing and compatibility with the materials of the photosensitive and image-receiving layers and the processing liquid so as not to interfere with image formation.

In the manufacturing and assembly of a film unit according to the invention, the photosensitive and image-recording elements are laminated to one another as a step which is performed early in the assembly process. For example, photosensitive and image-recording elements 12 and 14 such as described in the foregoing example are manufactured by coating the appropriate layers on elongated support strips by conventional continuous coating practices, including baking the coated strips to form integral, finished laminates that can be handled and utilized, if desired, in their then existing conditions. Typical photosenstive 12 and image-receiving elements 14 are shown in FIG. 3 of the drawings, the photosensitive element including a support layer 70 and a photosensitive layer 72, the latter, in the preferred form, comprising a plurality of strata including differently sensitized silver halide emulsions and appropriate dye developers; and the image-receiving element including a support layer 74 and an image-receptive layer 76, preferably including a plurality of strata as previously described. For more detailed description of the preparation of photosensitive and image-receiving elements of the type incorporated in the film unit of the invention, reference may be had to the aforementioned 3,415,644 patent.

It has been found that the integrity of the silver halide emulsion layer or layers can be improved and cleaner separation of the elements assured by hardening the emulsion layer prior to lamination of the photosensitive and image-receiving elements. Hardening agents suitable for this purpose include inorganic agents providing polyvalent metallic atoms, specifically polyvalent aluminum or chromium ions, and organic agents of the aldehyde type such as formaldehyde and succindialdehyde. For further examples of hardening agents, reference may be had to my aforementioned 3,415,644 patent.

The photosensitive and image-recording elements are adhered or laminated to one another by two intermediate layers of polymeric film-forming material. A first intermediate layer, designated 78 in FIG. 3, is formed on either the silver halide emulsion layer 74 of the photosensitive element 12 or on the image-receiving layer 72 of image-receiving element 14, preferably the latter. Layer 78 comprises a polymer which is substantially insoluble in neutral aqueous solutions and is soluble in aqueous alkaline solutions of which the processing liquid is exemplary. Polymers of this type are preferred for reasons which will appear hereinafter and because of the reduced likelihood of the polymeric layer interfering with the image-forming process in view of the solubility of the polymer in the aqueous alkaline processing liquid. Polymers soluble in aqueous alkaline solutions and useful for this purpose include cellulose acetate hydrogen phthalate, hydroxyethyl methacrylate and vinyl acetate. An image-receptive layer of the type described in the previous example was coated with a layer of cellulose acetate hydrogen phthalate by applying the polymer in an organic solution as follows:

A solution consisting of 50 grams of cellulose acetate hydrogen phthalate dissolved in 2065 cc. of acetone, 3050 cc. of methyl ethyl ketone, and 460 cc. of an organic solvent having the formula: $C_4H_9OCH_2CH_2OH_2$, and sold by Carbide and Carbon Chemicals Corporation under the trademark "Butyl Cellosolve," was coated onto the image-receiving layer at a coverage of 40 mgs./ft.$^2$ of cellulose acetate hydrogen phthalate. This coating was then dried by baking the image-receiving element for approximately 30 seconds at 100° F., 40 seconds at 125° F., and 30 seconds at 175° F. The "Butyl Cellosolve" was added to the solution for the purpose of raising the boiling point thereof and thereby inhibiting blushing of the polymeric film.

Figure 4:
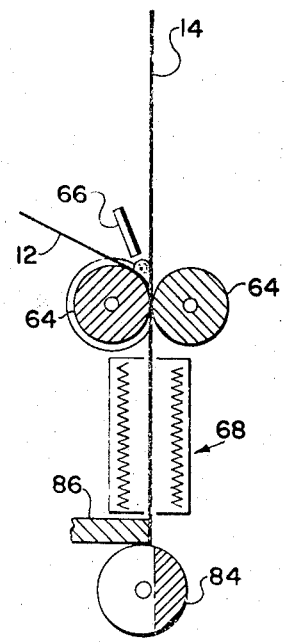
FIG. 4 is a somewhat schematic view, illustrating the method of manufacturing the film unit of FIGS. 1 through 3.

By way of example, the coated photosensitive element and the image-receiving element were then laminated or adhered to one another by advancing the elements (or elongated strips) between a pair of pressure-applying rolls while introducing an aqueous solution of a polymeric film-forming agent between the element at the nip of the rolls. As illustrated in FIG. 4, the photosensitive and image-receiving sheets 12 and 14 are advanced into superposition at the nip of a pair of laminating rolls 64, one of which may be provided with flanges at its ends for containing the laminating liquid or aqueous solution of the polymer, which is introduced between the sheets at the nip of the rolls through a tube 66 where the liquid is permitted to form a meniscus. In the example given, the laminating liquid comprised a solution of 1.23 grams of hydroxypropyl cellulose in 100 cc. of water with a viscosty of about 100 cps. at 70° F. and the sheets were laminated by moving them at the rate of 45 inches per minute between a pair of hard rubber rolls of approximately 60 to 70 durometer, biased toward one another to exert approximately 62 p.s.i. pressure. The quantity of the film-forming agent distributed between the sheets was relatively small, being approximately 1.45 mgs./ft.$^2$. The liquid was distributed in contact with the sheets and the sheets were pressed together so as to adhere them to one another over substantially their entire facing surfaces. The small quantity of the film-forming agent employed to form second intermediate layer 80 has been found to contribute to the formation of a bond between the sheets that is secure under normal conditions encountered in manufacture, storage, and use, and having properties that are not unduly altered in response to changes in humidity, yet ruptures readily, easily, and cleanly, leaving the adjacent photosensitive and image-receiving layers intact, when subjected to tension as by spreading a mass of liquid between the sheets.

The incorporation of firs intermediate layer 78, formed of a polymeric film-forming material that is insoluable in the solvent for the film-forming agent of the second intermediate layer 80, has been found to contribute to the formation of an adhesive bond between the photosensitive and image-receiving layers which can be relied upon to rupture readily and cleanly without disturbing the adherence between other layers of the laminates comprising the photosensitive and image-receiving elements.

The remaining steps in the manufacture and assembly process illustrated include advancing the laminated sheets from laminating rolls 64 into and through an oven 68 where they are baked to evaporate the solvent of the laminating liquid and thence to cutting means such as rotary knife 84 and anvil 86 where the individual sandwiches are cut to length. The remaining assembly steps include adhering binding element 20 to the sandwich comprising photosensitive and second sheets 12 and 14 and attaching a container of processing liquid thereto. It has been found that prelaminating elongated strips of the photo- and image-recording sheet material and then severing them to the desired length has the added advantage of delaminating, or at least weakening, the bond between the two sheets in the region in which they are cut. This includes the leading edge portions of the two elements where they are coupled to a container of processing liquid and where delamination of the elements by the processing liquid is initiated. This delamination, or weakening of the bond, by cutting occurs in a region extending inwardly from the leading edges of the sheets a very small fraction of an inch, e.g. a few thousandths, and while it has no observable effect on the lamination of the elements of the film unit, it is very effective in facilitating initiation of delamination by the processing liquid.

Since certain changes may be made in the above method without departing from the scope of the invention herein involved, it is intended that all matter contained in the above description or shown in the accompanying drawings shall be interpreted as illustrative and not in a limiting sense.

What is claimed is:

1. A method of forming a photographic film unit adapted to be exposed and processed by a liquid processing composition distributed within said film unit including:
    coating a plurality of selectively sensitized photosensitive silver halide emulsion layers having associated therewith diffusion transfer process dye image-providing materials on a first dimensionally stable layer to form a photosensitive element;
    coating on either said photosensitive element or on a second dimensionally stable layer element a dyeable polymeric layer adapted to receive dye image-providing materials diffusing thereto;
    coating as a top layer on either said first or second dimensionally stable layers a layer of an alkali soluble polymeric material;
    moving said photosensitive and second elements along convergent paths into face-to-face relation with said support layers located outermost;
    during movement of said elements into face-to-face relation, distributing an aqueous solution of a polymeric film-forming material having adhesive properties in a thin layer between the facing surfaces of said elements;
    drying said elements and the last-mentioned layer of liquid to laminate said elements to one another over an area adapted to be exposed and processed and including the major portion of the facing surface of one of said elements, with a bond strength weaker than the bond between any other layers of said film unit; and
    securing a rupturable container of an aqueous alkaline processing liquid to said elements at an edge of one of said elements in position to discharge its liquid contents between said elements.

2. The method defined in claim 1 including laminating said elements to one another in such a way that narrow portions of said elements adjacent said edge are in face-to-face relation but unbonded to one another.

3. The method defined in claim 1 including securing binding means to margins of said support layers and said container to secure said elements in face-to-face relation.

4. A method of forming a photographic film unit adapted to be exposed and processed by a liquid processing composition distributed within said film unit comprising:
    coating a photosensitive silver halide emulson layer on a dimensionally stable support layer to form a photosenitive element;
    coating an alkaline solution permeable polymeric image-receiving layer on a dimensionally stable support layer to form a second element;
    applying a coating of a nonaqueous solution including a polymer soluble in aqueous alkaline solutions to one of said emulsion and image-receiving layers;
    drying said coating to remove the solvent therefrom;
    moving said photosensitive and second elements along convergent paths into face-to-face relation with said support layers located outermost;
    during movement of said elements into superposition, distributing an aqueous liquid including a polymeric film-forming agent in a thin layer between the facing surfaces of said elements;
    drying said elements and the last-mentioned layer of liquid to laminate said elements to one another; and
    delaminating marginal portions of said elements adjacent an edge thereof at a layer intermediate said silver halide and image-receiving layers.

5. The method defined in claim 4 including securing a rupturable container of an aqueous alkaline processing liquid to said marginal portions of said elements at which said elements are delaminated.

6. The method defined in claim 4 wherein said nonaqueous solution is coated onto said image-receiving layer of said second element.

7. The method defined in claim 4 wherein said silver halide emulsion layer is treated with a hardening agent to increase the dimensional stability thereof.

8. The method defined in claim 4 wherein said nonaqueous solution includes cellulose acetate hydrogen phthalate in an organic solvent.

References Cited
UNITED STATES PATENTS

| | | | |
|---|---|---|---|
| 2,543,181 | 2/1951 | Land | 96—29 |
| 3,220,835 | 11/1965 | Land | 96—29 |
| 3,232,761 | 2/1966 | Allen et al. | 96—66 |
| 3,255,002 | 6/1966 | Rogers | 96—29 |
| 3,620,724 | 11/1971 | Land | 96—3 |

ALFRED L. LEAVITT, Primary Examiner

R. A. DAWSON, Assistant Examiner

U.S. Cl. X.R.

96—3, 28, 29 D, 76 C, 76 R; 117—34, 62.2, 76 F; 156—291, 299, 307, 310, 344; 161—147, 149, 410